United States Patent [19]
Ito et al.

[11] Patent Number: 5,843,496
[45] Date of Patent: Dec. 1, 1998

[54] MOLD CLAMPING MECHANISM OF AN INJECTION MOLDING MACHINE

[75] Inventors: Susumu Ito; Koichi Nishimura, both of Minamitsuru-gun, Japan

[73] Assignee: Fanuc Ltd., Yamanashi, Japan

[21] Appl. No.: 776,955

[22] PCT Filed: Jun. 13, 1996

[86] PCT No.: PCT/JP96/01618

§ 371 Date: Feb. 10, 1997

§ 102(e) Date: Feb. 10, 1997

[87] PCT Pub. No.: WO97/00162

PCT Pub. Date: Jan. 3, 1997

[30] Foreign Application Priority Data

Jun. 14, 1995 [JP] Japan .................................. 7-170448

[51] Int. Cl.[6] .................................................. B29C 33/20
[52] U.S. Cl. ................ 425/589; 100/258 A; 425/451.5; 425/592; 425/593
[58] Field of Search .................................. 425/589, 451.6, 425/593, 592, 451.5, 451.2, 451.9, 595; 100/272, 258 A

[56] References Cited

U.S. PATENT DOCUMENTS

| | | | |
|---|---|---|---|
| 4,773,845 | 9/1988 | Nagura et al. | 425/592 |
| 5,370,524 | 12/1994 | Liang et al. | 425/556 |
| 5,565,224 | 10/1996 | Stillhard | 425/589 |
| 5,585,126 | 12/1996 | Heindl et al. | 425/589 |

FOREIGN PATENT DOCUMENTS

| | | |
|---|---|---|
| 62-149410 | 7/1987 | Japan . |
| 2-25259 | 1/1990 | Japan . |
| 2-141206 | 5/1990 | Japan . |
| 6-328453 | 11/1994 | Japan . |

Primary Examiner—Patrick Ryan
Assistant Examiner—Iurie A. Schwartz
Attorney, Agent, or Firm—Staas & Halsey

[57] ABSTRACT

In a mold clamping apparatus of an injection molding machine using five-point double toggles, a projection (17) is formed at a side of a link (14) of which one end is connected to a rear platen (6), that side being opposite to the side facing a crosshead (18). And a pin is inserted in a through hole formed in the projection (17) and a through hole formed in the other end of a link (16) of which one end is connected to the crosshead, with these through holes being in alignment with each other.

7 Claims, 7 Drawing Sheets

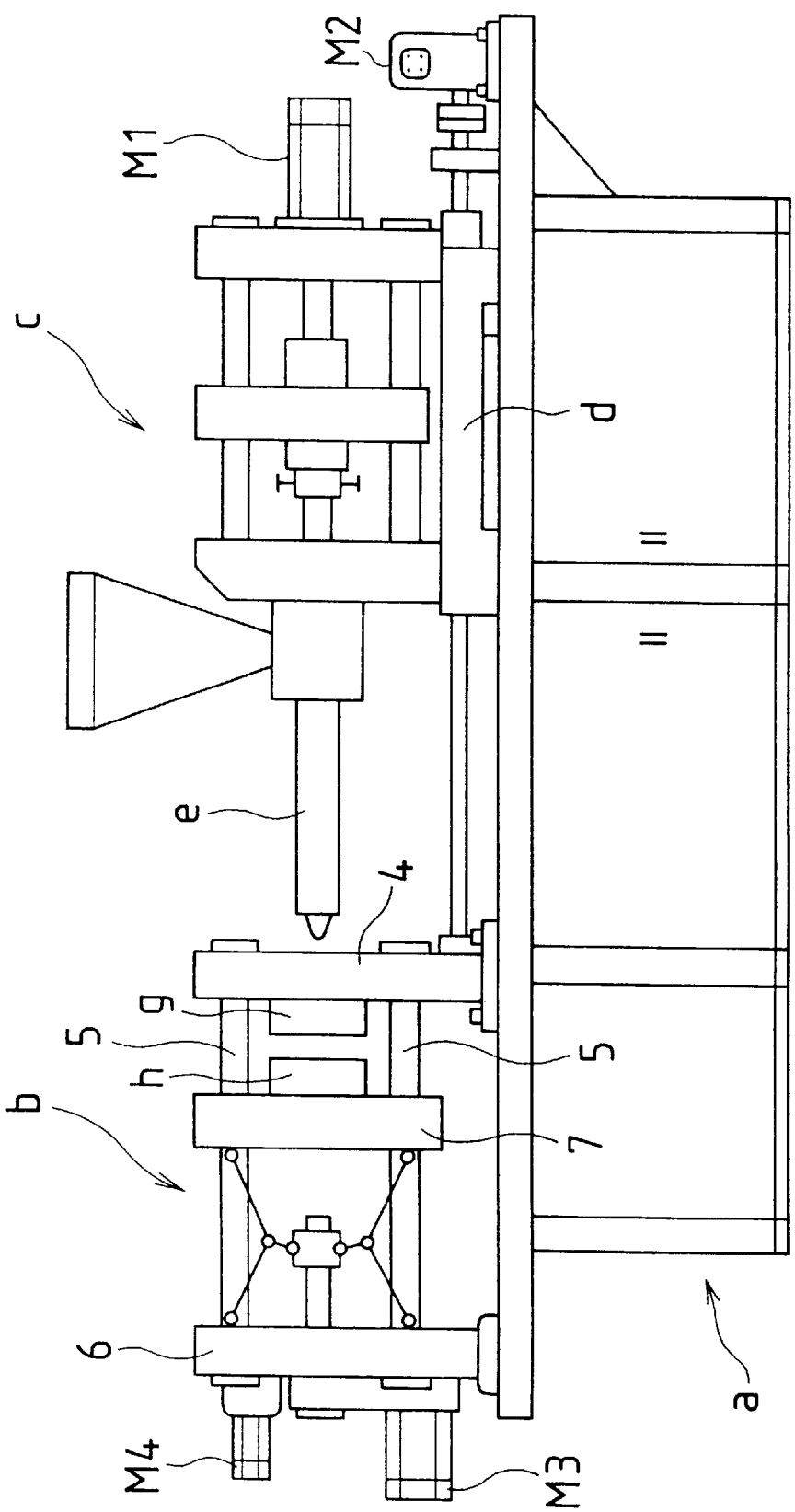

MOLD CLAMPING MECHANISM OF AN INJECTION MOLDING MACHINE

TECHNICAL FIELD

The present invention relates to an improvement of a mold clamping mechanism of an injection molding machine using a five-point double-toggle link mechanism.

RELATED ART

Mold clamping mechanisms of injection molding machines that utilize toggle links are already known. The mold clamping mechanisms of this type are divided broadly into two categories; single-toggle mold clamping mechanisms composed of single set of a toggle link, and double-toggle mold clamping mechanisms composed of two sets of toggle links.

As shown in FIG. 6 illustrating a general example, an injection molding machine is composed of a mold clamping mechanism b and an injection mechanism c that are arranged in a straight line on a base a. It is advisable generally to miniaturize the mold clamping mechanism b, since the overall length of the mold clamping mechanism b directly influences the overall length of the injection molding machine, and the vertical width of the mold clamping mechanism b influences the substantial overall height of the injection molding machine.

Referring to FIG. 6, a motor-operated injection molding machine is given as an example of the injection molding machine, and the injection mechanism c is provided with an injection servomotor MUI for advancing an injection screw in a beeline by means of a ball nut-screw and a screw-rotation servomotor (not shown) for rotating the injection screw to make it carry out metering-kneading operation. An extruder base d to which the injection mechanism c is fixed is provided with a rectilinear drive mechanism that is composed of an induction motor or servomotor M2, ball screw, ball nut, etc. If necessary, a nozzle touching operation to cause the distal end of an injection cylinder e to plunge into a stationary platen 4 or a sprue breaking operation to cause the cylinder end to recede from the stationary platen 4 is carried out.

The mold clamping mechanism b is composed of the stationary platen 4 fitted with a cavity-side mold g fixed on the base a, a rear platen 6 fastened to the stationary platen 4 by means of tie bars 5, a servomotor M4 for adjusting the position of the rear platen 6 in accordance with the mold thickness and set mold clamping force, and a moving platen 7 movably attached to the tie bars 5, driven by means of a servomotor M3 utilizing a multiplier, and fitted with a force-side mold h. The aforesaid single toggle, double toggle, etc. constitute this multiplier section.

Generally, as shown in FIG. 7, a single-toggle mold clamping mechanism is designed so that a piston of an oscillating hydraulic cylinder 32, which is located at right angles to a toggle link 31 in a lock-up state (FIG. 7(A)), is pivotally mounted on a node portion 33 of the toggle link 31, and the toggle link 31 is bent or stretched by directly pushing or pulling the node portion 33 of the toggle link 31 through extension or contraction of the aforesaid piston, whereby a moving platen 34 is moved to perform mold opening or clamping operation. Naturally, the opposite end portions of the toggle link 31 used are pivotally mounted on the respective central portions of a rear platen 35 and the moving platen 34, and the bottom portion of the oscillating hydraulic cylinder 32 that causes the toggle link 31 to bend or stretch is pivotally mounted for rocking motion on the top surface of the body (not shown) of the injection molding machine that carries the mold clamping mechanism thereon.

As shown in FIGS. 8(A) and 8(B), moreover, a double-toggle mold clamping mechanism is designed so that two sets of toggle links 41, which are bendable toward each other, are juxtaposed in upper and lower positions between a rear platen 42 and a moving platen 43, a crosshead 44 movable straight in the mold opening or clamping direction is provided in a position intermediate between the two toggle links 41, and an end portion of a crosshead link 47 that is pivotally mounted on a node portion 45 of each toggle link 41 or a position 46 nearby is pivotally mounted on the aforesaid crosshead 44. By linearly moving the crosshead 44, the two sets of toggle links 41 are bent or stretched synchronously, whereupon the moving platen 43 is moved to perform the mold opening or clamping operation. In FIG. 8(A) shows the toggle links 41 in a fully stretched state or lock-up state, and 8(B) shows a mold opening state.

In general, single-toggle mold clamping mechanisms are adapted for use in a small-sized injection molding machine, and double-toggle mold clamping mechanisms for use in a medium- or large-sized injection molding machine that requires a relatively large mold clamping force.

Further, the double-toggle mold clamping mechanisms are classified into two types, the so-called four-point type and five-point type, depending on the difference in the method of mounting the crosshead links on the toggle links. The mold clamping mechanism shown in FIGS. 8(A) and 8(B) is of the five-point type, and the mold clamping mechanism shown in FIG. 6 is of the four-point type. FIG. 2 shows an example of a conventional four-point mold clamping mechanism 2 in detail, and FIG. 3 shows an example of a conventional five-point mold clamping mechanism 3 in detail. In FIGS. 2 and 3, an upper portion above a center line CL of each mold clamping mechanism 2 or 3 illustrates a lock-up state of the mold clamping mechanism 2 or 3, while a lower portion below the center line CL illustrates the maximum stroke of mold opening of each mold clamping mechanism 2 or 3. FIGS. 2 and 3 are side views showing outlines of the general arrangements of the mold clamping mechanisms 2 and 3, respectively, and the perspective drawing method is partially applied to them.

First, constructions common to the conventional four-point mold clamping mechanism 2 and the conventional five-point mold clamping mechanism 3 will be described in brief. In FIGS. 2 and 3, numeral 4 denotes a stationary platen fixed to the injection molding machine body, and four tie bars 5 are immovably fixed to the four corners of the stationary platen 4, individually. Further, a rear platen 6 is attached to the respective end portions of the tie bars 5, and the distance between the stationary platen 4 and the rear platen 6 can be freely adjusted by means of a mold thickness adjusting mechanism (not shown) that is provided at an engaging portion between the tie bars 5 and the rear platen 6. Also, a moving platen 7 is slidably mounted on the tie bars 5. As two sets of toggle links 10, 10, which are formed of a rear-platen-side link (hereinafter referred to as first link) 8 and a moving-platen-side link (hereinafter referred to as second link) 9 each, are bent or stretched synchronously, the moving platen 7 moves toward or away from the rear platen 6, whereby the mold opening or clamping operation is performed.

More specifically, a crosshead 11, which is movable straight in the mold opening or clamping direction by means of a drive mechanism composed of a ball nut-screw (or hydraulic ram, etc.), is provided in a position (on the center line CL) intermediate between the toggle links 10, 10 that are vertically juxtaposed so as to be bendable toward each other. The respective distal ends of crosshead links 12, 12 that are pivotally mounted on the upper and lower sides of the crosshead 11, individually, pull in or push out node portions of the toggle links 10, 10, depending on the moving direction of the crosshead 11, whereupon the toggle links 10, 10 are bent or stretched, that is, the mold opening or clamping operation is performed.

Points B, C and D shown in FIGS. 2 and 3 represent a pivotal point between a staple of the rear platen 6 and each first link 8, a pivotal point between a staple of the moving platen 7 and each second link 9, and a pivotal point between the crosshead 11 and each crosshead link 12, respectively, and point A represents a pivotal point between the first and second links 8 and 9, that is, a node of each toggle link 10.

The conventional four-point mold clamping mechanism 2 shown in FIG. 2 and the conventional five-point mold clamping mechanism 3 shown in FIG. 3 differ from each other mainly in the position of the crosshead link 12 mounted on the toggle link 10.

In the case of the conventional four-point mold clamping mechanism 2 shown in FIG. 2, the position of the pivotal point between the toggle link 10 and the crosshead link 12 is completely in alignment with that portion of the toggle link 10 which corresponds to the node A. In the case of the conventional five-point mold clamping mechanism 3 shown in FIG. 3, on the other hand, a pivotal point E is provided by forming a projection 13 in an inside position on that portion of the first link 8 near the node A, and the crosshead link 12 is pivotally mounted in the position E. If the mechanisms are designed so that a maximum allowable mold thickness T1 and maximum allowable mold opening stroke T2 of the conventional four-point mold clamping mechanism 2 are equal to a maximum allowable mold thickness T1 and maximum allowable mold opening stroke T2 of the conventional five-point mold clamping mechanism 3, respectively, the aforesaid difference consequentially permits the conventional five-point mold clamping mechanism 3 shown in FIG. 3 to be constructed so that its overall length T3 is shorter than that of the conventional four-point mold clamping mechanism 2 shown in FIG. 2.

One of causes for this is a control input for the crosshead 11 required in moving the moving platen 7 for the maximum allowable mold opening stroke T2. More specifically, if the span of the first link 8 of the conventional four-point mold clamping mechanism 2 is equal to the span of the first link 8 of the conventional five-point mold clamping mechanism 3, the distance between B and E on the first link 8 of the conventional five-point mold clamping mechanism 3 is naturally shorter than the distance between B and A on the first link 8 of the conventional four-point mold clamping mechanism 2. Accordingly, the rectilinear movement (operating amount) of the crosshead 11 of the conventional five-point mold clamping mechanism 3 required for rocking their first links 8 by a certain angle can be shorter than that of the conventional four-point mold clamping mechanism 2 required for rocking their first links 8 by the same angle. A reduction in the necessary rectilinear movement stroke for the crosshead 11 results in a reduction in a distance T4 between the rear platen 6 and the moving platen 7, that is, shortening of the overall length T3 of the mold clamping mechanism.

Another reason lies in that the conventional five-point mold clamping mechanism 3, unlike the conventional four-point mold clamping mechanism 2, does not require the crosshead link 12 to be pivotally mounted on the same axis as the node A of the toggle link 10, so that the arrangement surrounding the node A is simplified. Thus, in the conventional five-point mold clamping mechanism 3 compared with the conventional four-point mold clamping mechanism 2, the arrangement surrounding the node A is simplified, and the width of the crosshead link 12 itself need not be wide. Especially when the upper and lower first links 8 are arranged in a straight line as the toggle links 10 are bent during the mold opening operation or the like, therefore, the respective nodes A of the upper and lower toggle links 10 or the upper and lower crosshead links 12 are not liable to interfere with each other. In the case where a vertical width T5 of the conventional four-point mold clamping mechanism 2 and a vertical width T5 of the conventional five-point mold clamping mechanism 3 are equal to each other, the span of the first link 8 of the conventional five-point mold clamping mechanism 3 can be consequentially made somewhat longer than that of the first link 8 of the conventional four-point mold clamping mechanism 2. As a result, the movement of the moving platen 7 based on the same rocking angle for the first links 8 increases. If the maximum allowable mold opening stroke T2 is fixed, the movement of the crosshead 11 can be made less in the conventional five-point mold clamping mechanism 3 than in the conventional four-point mold clamping mechanism 2. As mentioned before, the reduction in the necessary movement for the crosshead 11 serves to shorten the overall length T3 of the mold clamping mechanism.

Consequently, in the conventional five-point mold clamping mechanism 3, compared with the conventional four-point mold clamping mechanism 2, the first link 8 can be rocked more widely with a small rectilinear movement of the crosshead 11, and the span of the first link 8 itself can be made longer than the span of the first link 8 in the conventional four-point mold clamping mechanism 2. Accordingly, the overall length T3 of the conventional five-point mold clamping mechanism 3 can be made shorter than that of the conventional four-point mold clamping mechanism 2 without changing the condition for the vertical width T5 of the mold clamping mechanism as long as the necessary movement of the node A for the mold opening or clamping operation, that is, the necessary maximum allowable mold opening stroke T2, is common to these two mechanisms.

However, the conventional five-point mold clamping mechanism 3 is subject to a problem that it cannot exhibit a mold clamping force equivalent to that of the conventional four-point mold clamping mechanism 2 unless a thrust force for the rectilinear movement applied to the crosshead 11 is greater than in the case of the conventional four-point mold clamping mechanism 2 if the necessary mold clamping force for the conventional four-point mold clamping mechanism 2 is equal to the necessary mold clamping force for the conventional five-point mold clamping mechanism 3.

Naturally, this is partly attributable to the relation (substantial reduction gear ratio) between the movement of the crosshead 11 and the movement of the node A. The greatest cause, however, is reduction of the span of the crosshead link 12 itself. In general, the longer the span of the crosshead link 12, the greater the mold clamping force obtained. Since the distance between D and E in the conventional five-point mold clamping mechanism 3 is shorter than the distance between D and A in the conventional four-point mold clamping mechanism 2 by a margin corresponding to the projection 13, the former mechanism is disadvantageous with respect to the mold clamping force.

Increasing the rectilinear movement thrust force itself to be applied to the crosshead 11 is one of obvious methods to solve the above problem. To attain this, however, the output of the drive mechanism must be enhanced, so that there are some problems on the production cost, running cost (electric power cost) entailed during use, etc. In the case where a ball nut-screw or the like is used as a part of the drive mechanism, a power transmission mechanism itself may possibly be damaged by wear or seizure attributable to overloading. In some cases, therefore, the design may be subject to restrictions, such as the exclusive use of the hydraulic ram or the like as a drive source, so that the degree of freedom in design may unfavorably be restrained.

According to another feasible method for increasing the mold clamping force relatively easily, moreover, the substantial mold clamping force is increased by lengthening the distance between D and E (span of the crosshead link 12) in the conventional five-point mold clamping mechanism 3 like the one shown in FIG. 3 in a manner such that the toggle link 10 is located with a substantial vertical offset from the center line CL of the mold clamping mechanism 3 (path of movement of the crosshead 11). With use of this arrangement, however, the vertical width T5 of the mold clamping mechanism 3 is so great that reduction of the mold clamping mechanism in size and weight is hindered. During the mold clamping operation, moreover, only the upper and lower end portions of the moving platen 7 are pressed strongly. In the case where a mold to be attached is small-sized, therefore, the moving platen 7 may be curved, and furthermore, this curvature may prevent a satisfactory mold clamping force from being transmitted to the central portion of the mold, thus possibly causing defective molding.

SUMMARY OF THE INVENTION

The object of the present invention is to provide a mold clamping mechanism of an injection molding machine, adapted to eliminate the aforementioned drawbacks of the prior art, having a compact general construction, and capable of exhibiting a satisfactory mold clamping force by the use of a drive source with a relatively low output.

In order to achieve the above object, according to the present invention, there is provided a mold clamping apparatus of an injection molding machine, which comprises a toggle link formed by rockably connecting the other end of a first link of which one end is pivotally attached to a rear platen and the other end of a second link of which one end is pivotally attached to a moving platen, a crosshead movable along a straight line in mold opening and closing directions by means of power from a drive source, and a crosshead link having one end rockably connected to a part of the crosshead and the other end to a projection formed on the first link, in which the projection of the first link, rockably connected with the other end of the first link, is formed on the side of the first link which is opposite from the side facing the crosshead.

According to the present invention, having the arrangement described above, the mold clamping force is enhanced by lengthening the span of the crosshead link without substantially separating the toggle link itself outward from the crosshead, while the size of the mold clamping mechanism in a direction perpendicular to the moving direction of the crosshead is prevented from increasing. Further, the necessary rectilinear movement of the crosshead for transition from a mold opening state to a mold closing state is shortened. Thus, the overall length of the mold clamping mechanism can be reduced.

BRIEF DESCRIPTION OF THE DRAWINGS

FIG. 6 is a side view showing an outline of the general construction of an injection molding machine;

DETAILED DESCRIPTION OF THE PREFERRED EMBODIMENTS

Figure 1:
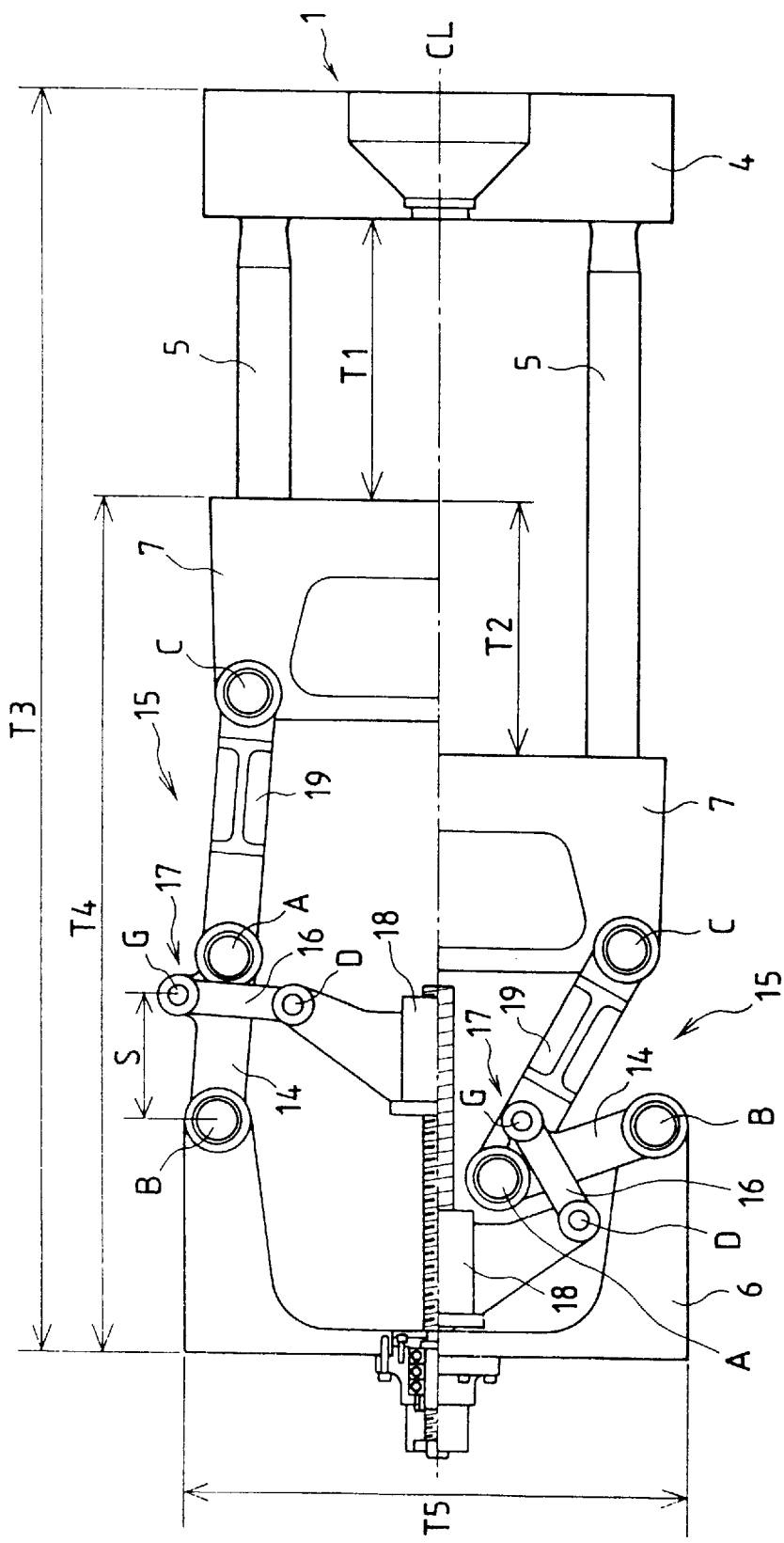
FIG. 1 is a side view showing an arrangement of a mold clamping mechanism according to one embodiment of the present invention.

Some embodiments of the present invention will now be described with reference to the drawings. FIG. 1 is a side view showing the general arrangement of a mold clamping mechanism 1 of an injection molding machine according to one embodiment to which the present invention is applied. The perspective drawing method is partially applied to FIG. 1, of which an upper portion above a center line CL of the mold clamping mechanism 1 illustrates a lock-up state of the mold clamping mechanism 1, while a lower portion below the center line, CL illustrates the maximum stroke of mold opening of the mold clamping mechanism 1.

Figure 2:
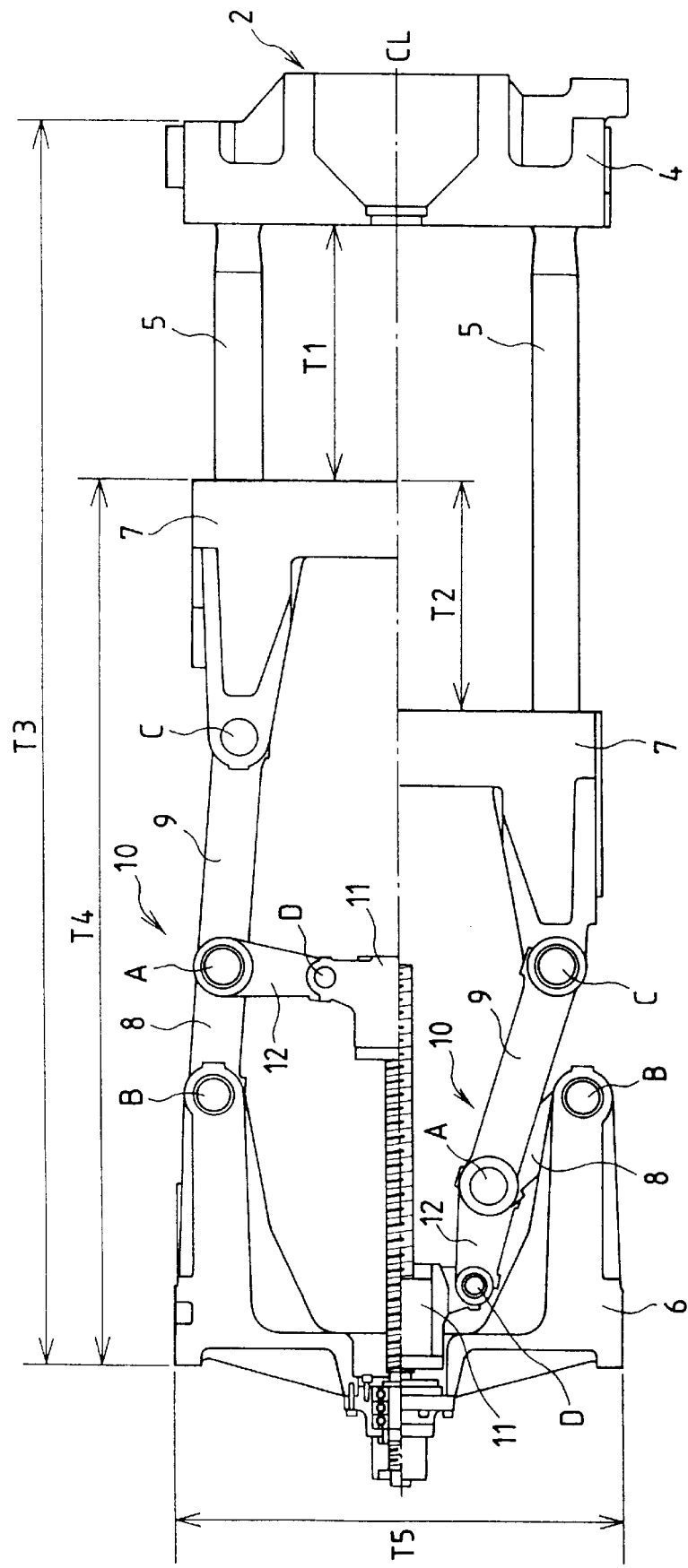
FIG. 2 is a side view showing an arrangement of a conventional four-point mold clamping mechanism.
Figure 3:
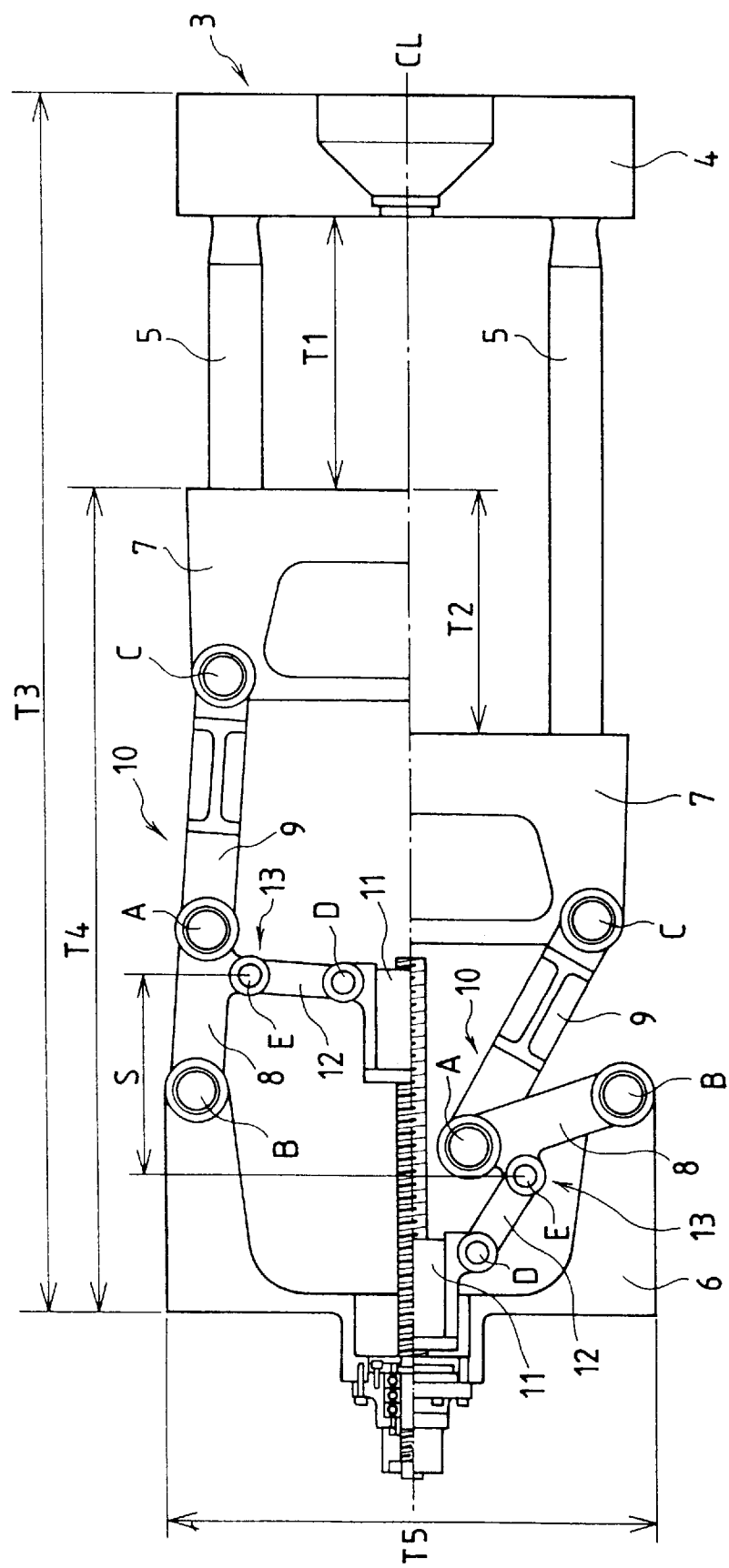
FIG. 3 is a side view showing an arrangement of a conventional five-point mold clamping mechanism.
Figure 8A:
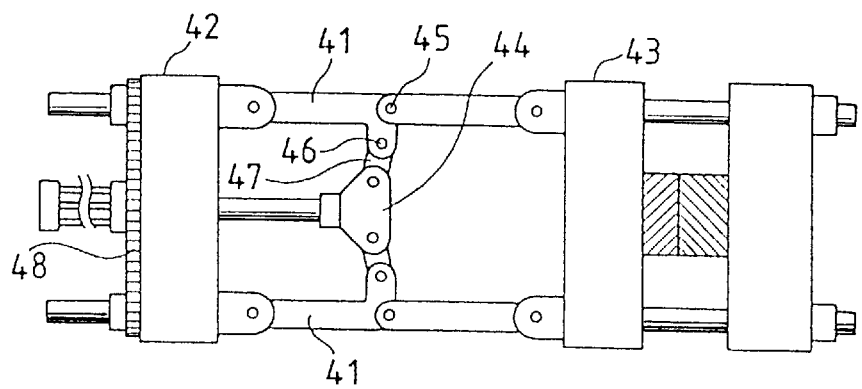
FIGS. 8A and 8B are schematic views of a conventional five-point double-toggle mold clamping mechanism.
Figure 8B:
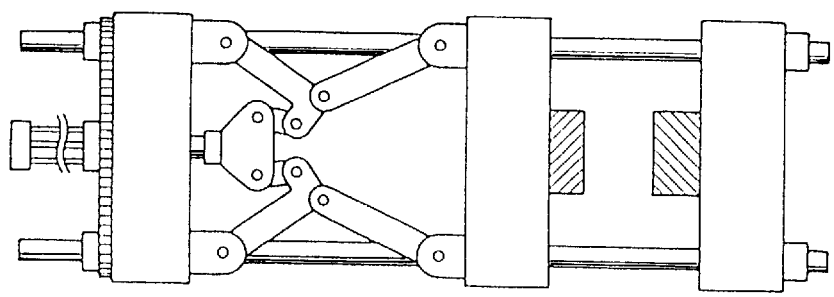

A stationary platen 4, tie bars 5, rear platen 6, moving platen 7, etc., among the elements associated with the arrangement of the mold clamping mechanism 1, are the same as those of the conventional four-point mold clamping mechanism 2 shown in FIGS. 2 and 6 or the conventional five-point mold clamping mechanism 3 shown in FIG. 3, so that a description of those elements is omitted in this case. In the case described with reference to FIG. 1, moreover, a crosshead 18 is caused to be in rectilinear motion in the mold opening or clamping direction by rotating the ball-nut side of a ball nut-screw by means of an electric motor or the like. The ball nut-screw is formed of a ball screw attached to the central portion of the rear platen 6 so as to be rotatable and axially immovable, and a ball nut is fixed integrally to the side of the crosshead 18. It is to be understood, however, that the crosshead 18 can be caused to be in rectilinear motion as in the conventional case by utilizing a drive source, such as a hydraulic ram, in place of the aforesaid arrangement, Further, a mold thickness adjusting mechanism similar to the conventional one, e.g., a chain (element denoted by numeral 48 in FIG. 8) or the like for changing the mold thickness by synchronously rotating lock nuts on the tie bars 5 at the sometime, is attached to an engaging portion between the tie bars 5 and the rear platen 6, whereby the distance between the stationary platen 4 and the rear platen 6 can be freely adjusted.

The mold clamping mechanism 1 according to the present embodiment differs from the conventional four-point mold clamping mechanism 2 shown in FIG. 2 and the conventional five-point mold clamping mechanism 3 shown in FIG. 3 in the position of a crosshead link 16 mounted on a first link 14, which constitutes a part of a toggle link 15, and the span of the crosshead link 16.

In the conventional four-point mold clamping mechanism 2 shown in FIG. 2, the position of the pivotal point between the first link 8 of the toggle link 10 and the crosshead 12 is completely in alignment with that portion of the toggle link 10 which corresponds to the node A. In the case of the conventional five-point mold clamping mechanism 3 shown in FIG. 3, moreover, the projection 13 is formed at an inside position on the portion of the first link 8 which is near the node A, projecting toward the crosshead 11, and the crosshead link 12 is pivotally mounted on the pivotal point E. In the mold clamping mechanism 1 according to the present embodiment, on the other hand, a pivotal point G is provided by forming a projection 17 at an outside position on the portion of the first link 14 which is near a node A of the toggle link 15. Thus, the crosshead link 16 is mounted on the toggle link 15 with an offset outside the region defined by the central axis of the toggle link 15 and the crosshead 18.

Figure 5A:
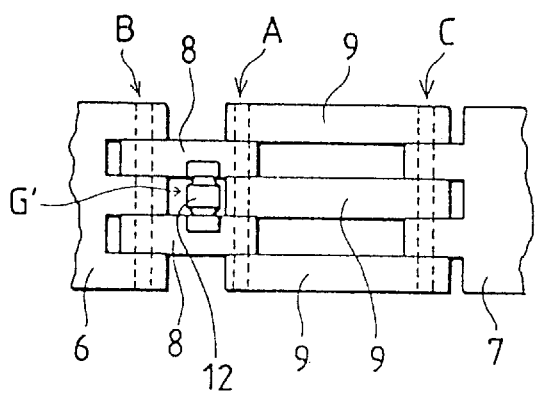
FIGS. 5a, 5b and 5c are plan views schematically showing the way of connection of toggle links used in conventional four- and five-point mold clamping mechanisms.
Figure 5B:
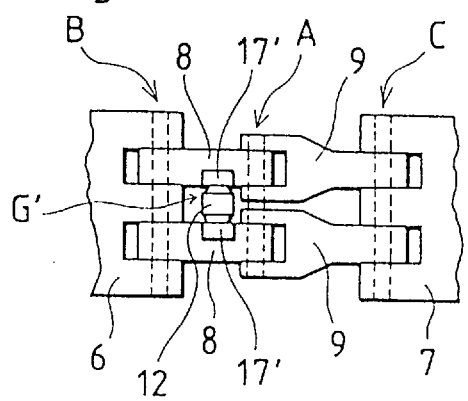
Figure 5C:
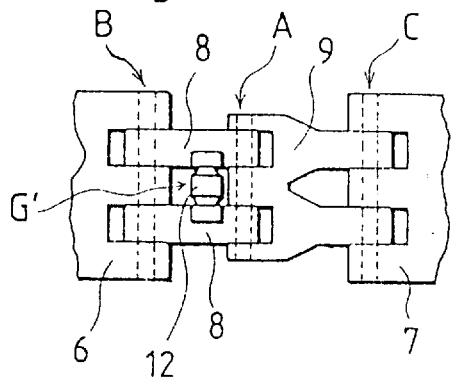
Figure 7A:
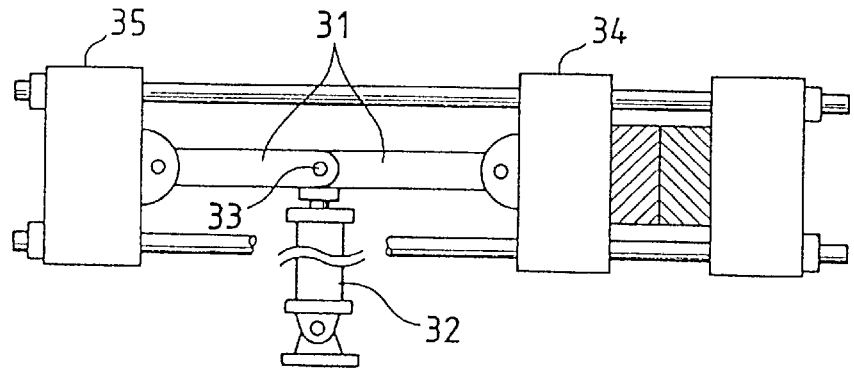
FIGS. 7A and 7B are schematic views of a conventional single-toggle mold clamping mechanism.
Figure 7B:
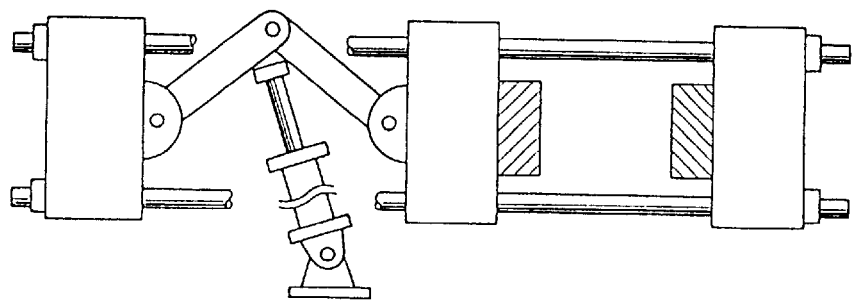

As a result, when the crosshead 18 is retreated to a position corresponding to the maximum allowable mold opening stroke T2, the distal end of the crosshead link 16 and the projection 17 of the first link 14 plunge into a second link 19. FIGS. 5(A)–5(C) are is a plan views schematically showing a method for connecting the first and second links used in the conventional four- and five-point mold clamping mechanisms. In the case shown in FIG. 5(a), three second links 9 are arranged in parallel, and two first links 8 are interposed between their respective end portions so that the links can be rotated about the position corresponding to the node A. If the crosshead link 12 is pivotally mounted outside the first links 8, that is, in a position G' corresponding to the pivotal point G of FIG. 1, the crosshead link 12 interferes with the second link 9 situated in the central position when an attempt is made to retreat the crosshead 18 to the position for the maximum mold opening stroke shown in FIG. 1, so that the crosshead 18 cannot be retreated satisfactorily for the mold opening operation (naturally, no problem is aroused with use of the conventional arrangement in which G' is situated in the region defined by the central axis of the first link 8 and the crosshead 11).

In the case shown in FIG. 5(b), moreover, two second links 9 are arranged in parallel, and the second links 9 and two first links 8 are connected in a manner such that the first links 8 butt on the respective end portions of the second links 9. If the crosshead link 12 is pivotally mounted in the position G' corresponding to the pivotal point G of FIG. 1, however, the distance between the second links 9, 9 is so short that the crosshead link 12 interferes with inside staple portions of the second links 9 when the crosshead 18 is retreated. No matter how thin the crosshead link 12 may be, pins that are indispensable to its pivotal mounting on the first links 8 inevitably interfere with inside staples at the respective distal end portions of the second links 9. Further, projections 17' that are provided on the first links 8 to be fitted with pins on which the crosshead link 12 is pivotally mounted interfere themselves with the second links 9, 9, so that the crosshead 18 cannot be retreated satisfactorily for the mold opening operation. Naturally, with use of the arrangement in which the respective staple portions of two second links 9 are united and connected with first links 8, as shown in FIG. 5(c), the crosshead, 18 cannot be retreated satisfactorily for the mold opening operation.

Referring now to the plan view of FIG. 9, the first embodiment of the present invention will be explained. This view corresponds to a plan view of the arrangement shown as a side view in FIG. 1. The first link 14 is formed by arranging a pair of link members 14a and 14b in parallel, leaving a gap through which the crosshead link 16 can pass.

A pin is supported on two projections 17 formed individually on these link members 14a and 14b, and the crosshead link 16 is rotatably connected to this pin. On the other hand, the second link 19 is also formed of a pair of link members 19a and 19b, of which the distal end portions are located outside the pair of link members 14a and 14b, which constitute the first link 14, at the node A, so as to hug the link members 14a and 14b from the outside. As a result, the two link members 14a and 14b, which are provided with their respective projections 17 and constitute the first link 19, can be thrust into the space between the two link members 19a and 19b that constitute the second link 19 on either side. Since the crosshead link 16 situated between the two link members 14a and 14b can rock freely, moreover, there is no possibility of the first link 14 (projections 17) or the crosshead link 16 interfering with the second link 19. In short, the toggle links 15 bend so that the distal end of the crosshead link 16 and the projections of the first link 14 get into the second link 19 that are formed of the two link members 19a and 19b (see the portion below the center line CL in FIG. 1).

Referring further to the plan view of FIG. 4, another embodiment, different from the embodiment shown in FIG. 9, will be explained. Also in this embodiment, first links 14 and a crosshead link 16 are prevented from interfering with second links 19, and moreover, the overall rigidity of toggle links is secured to maintain the mold clamping force. Since this view also corresponds to the plan view of the arrangement shown in FIG. 1, FIG. 1 will be used in combination with FIG. 4 in the following explanation.

In this embodiment, two toggle links 15, each including a second link 19 and a first link 14, are arranged in parallel, leaving a gap through which the crosshead link 16 can pass, whereby a pair of link units 15' are formed, and two pairs of such link units 15' are arranged above and below, as shown in FIG. 1. In each of the link units 15' situated above and below, each first link 14 is formed with a projection 17 that protrudes outward from the first link 14 in the vicinity of a pivotal mounting position (node A) for the second link 19 and the first link 14, and the distal end of the crosshead link 16 is pivotally mounted on a pin 20 that is supported on those two projections 17. Thus, each link unit 15' is provided with a node G that projects outside the region between the crosshead 18 and the first link 14.

It is to be understood that the pin 20 will interfere with the two second links 19 to prevent the first and second links 14 and 19 from bending, if it is passed through the overall combined width of the two first links 14 that are arranged in parallel. Accordingly, the pin 20 is passed only through the region between inside branches 14a and 14d of the staples that are provided individually on the respective distal ends of the two first links 14 arranged in parallel. Thus, it is sufficient that the projections 17 for the attachment of the pin 20 be also formed at least on the inside branches 14a and 14d of the staples, as shown in FIG. 4.

In the case where the projections 17 are formed only on the inside branches 14a and 14d of the staples, however, the individual first links 14 that constitute the pair of link units 15' are not in the same shape but are symmetrical, so that the parts of the first links 14 in the same link unit 15' are not interchangeable with one another (but, the respective first links 14 of the two pairs of link units 15', upper and lower, on each diagonal line are mutually replaceable). If the projections 17 are formed on the outside branches 14b and 14c of the staples of the first links 14, as well as on the inside branches 14a and 14d, there is no problem of interference with the second links 19 unless the pin 20 is not passed through the outside branches 14b and 14c of the staples. In working out a design giving priority to the interchangeability of the parts or in constructing the injection molding machine by manufacturing the first links 14 having the same shape only, in order to improve the production efficiency, therefore, the projections 17 having the same shape may be provided individually on both the inside and outside branches 14a, 14b; 14c, 14d of the staples of the first links 14. In this case, the pin 20 connects only the projections 17 on those branches 14a and 14d which are situated inside when assembled. The respective pin holes of the projections 17 on the outside branches 14b and 14c of the staples are normally left idle.

Figure 4:
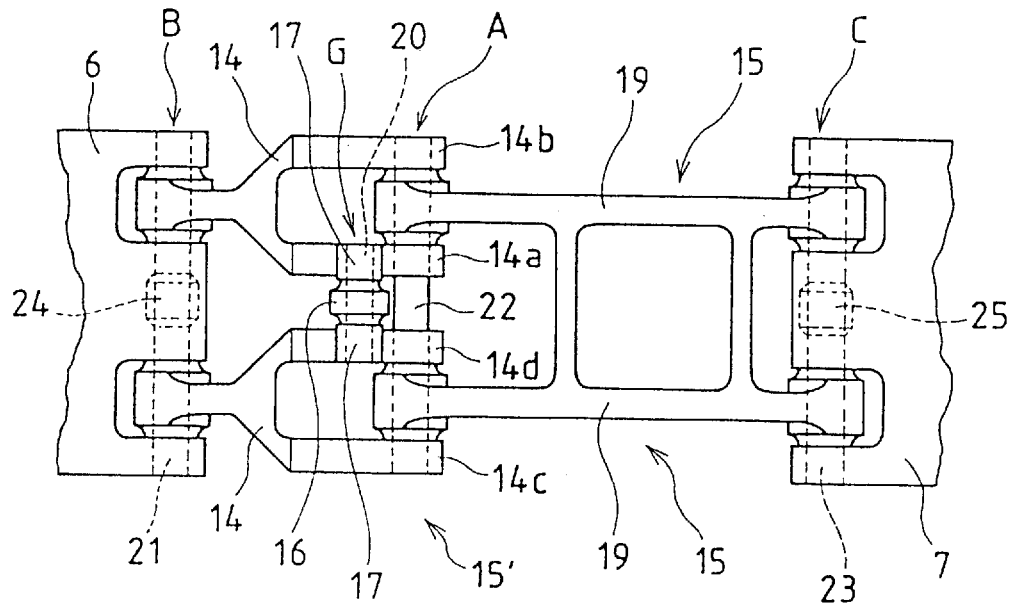
FIG. 4 is a plan view showing an arrangement of a mold clamping mechanism according to another embodiment of the present invention.

Although the two parallel second links 19 may be formed integrally in the shape of a ladder frame, as shown in FIG. 4, the individual second links 19 may be formed completely independent of each other.

In FIG. 4, numerals 21, 22 and 23 denote pins that constitute nodes B, A and C as pivotal points, respectively. The pin 22 that constitutes the node A may be divided into two pieces and located between the respective inside and outside branches of the staple of the individual first links 14. With such dimensional ratios between the various parts as is shown in FIG. 1, however, the relation between the values of the angle BGD obtained with the crosshead 18 in its most advanced position and in its most retreated position, that is, the relative position of the crosshead link 16 with respect to the node G, can be kept substantially constant without regard to the position of the crosshead 18. Thus, there is no possibility of the angle BGD becoming wider than the state illustrated, that is, there is no possibility of the central portion of the crosshead 18 interfering directly with the pin 22 (node A), so that the pin 22 need not be divided.

An annular space 24 that is formed by extending the central portion of a through hole in a rear platen 6 through which the pin 21 is passed is a grease reservoir for storing lubricating oil to be supplied between the outer peripheral surface of the pin 21 and the inner peripheral surface of the through hole. A grease reservoir 25 of the same construction is also provided on the side of a through hole in a moving platen 7 through which the pin 23 is passed.

In contrast to the case of the embodiment of FIG. 4, it might be supposed that forked staples can be formed on the side of the second links 19 with the distal ends of the first links 14 mounted between them, as in the prior art example shown in FIG. 5(b). However, such an arrangement is impossible of realization, since there is the possibility of the pin 20, which is essential to the pivotal attachment of the crosshead link 16 to the first links, as mentioned before, interfering with the inside staples at the distal end portions of the second links 19. Naturally, the problem of the interference between the pin 20 and the inside branches of the staples to be provided at the distal end portions of the second links 19 can be solved by omitting the inside branches of the staples of the second links 19. However, this arrangement is substantially identical with the arrangement of the embodiment (see FIG. 9) described first, that is, the arrangement in which the crosshead link 16, the first link 14 and the second links 19 are successively arranged offset from inside to outside. This arrangement may be obtained if only the inside branches of the staples of the second links 9 shown in FIG. 5(b) are omitted.

Figure 9:
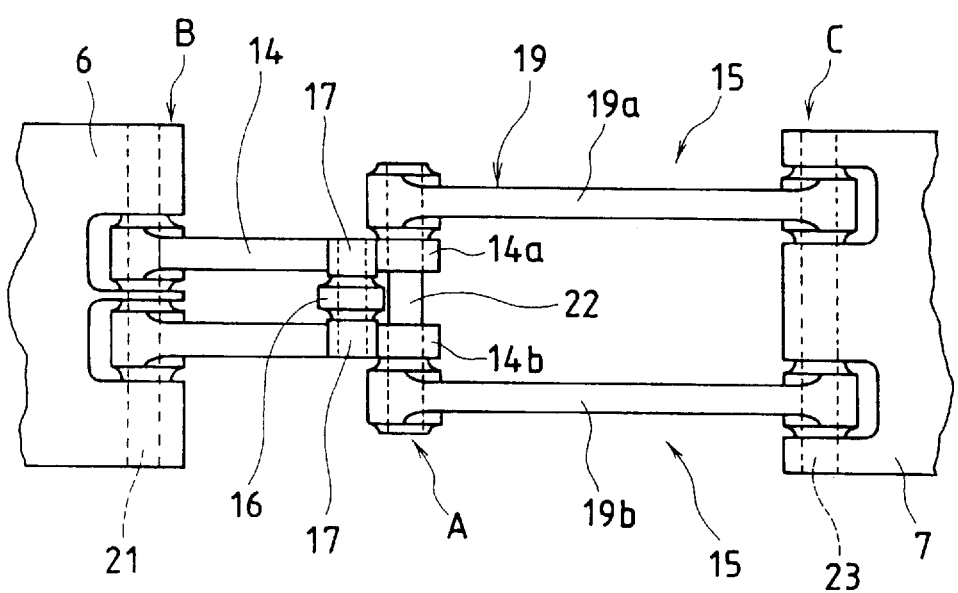
FIG. 9 is a plan view showing an arrangement of the mold clamping mechanism according to the one embodiment of the present invention.

In the embodiment described first with reference to FIG. 9, the crosshead link 16, the first link 14 and the second links 19 are successively arranged offset from inside to outside, so that it can hardly be said that the a mold clamping reaction force is always received along the cores of the toggle links 15 that are formed of the first and second links 14 and 19. In the embodiment shown in FIG. 4, however, the first and second links 14 and 19 are arranged completely in a straight line, so that the mold clamping reaction force can be supported easily, and the necessary mold clamping force can be maintained.

In the mold clamping mechanism according to each embodiment constructed in this manner, the distance B–G from the pivotal point B between the rear platen 6 and the first link 14 to the pivotal point G between the first link 14 and the crosshead link 16 is substantially equal to the distance between B and E in the conventional five-point mold clamping mechanism 3 shown in FIG. 3. Practically, however, the movement (control input) of the crosshead 18 that is required in moving the moving platen 7 for the maximum allowable mold opening stroke T2 can be much smaller than that for the conventional five-point mold clamping mechanism 3 shown in FIG. 3.

The reason is that a horizontal movement distance S (see FIG. 1) of the pivotal point G from the lock-up position to the position corresponding to the maximum allowable mold opening stroke T2, in orbital motion of the first link 14 of FIG. 1 and the first link 8 of FIG. 3 around the pivotal point B, is shorter than a horizontal movement distance S (see FIG. 3) of the pivotal point E from the lock-up position to the position corresponding to the maximum allowable mold opening stroke T2, as is evident from the comparison between the mold clamping mechanism 1 of the embodiment shown in FIG. 1 and the conventional five-point mold clamping mechanism 3 shown in FIG. 3.

According to the mold clamping mechanism 1 of the embodiment shown in FIG. 1, when the upper pivotal point G (first quadrant) moves clockwise from the lock-up position to the position (fourth quadrant) corresponding to the maximum allowable mold opening stroke T2, in a rectangular coordinate system having its origin on the pivotal point B above the center line CL, it moves substantially at right angles to the center line CL, from the first quadrant to the fourth quadrant. According to the conventional five-point mold clamping mechanism 3 shown in FIG. 3, on the other hand, when the upper pivotal point G (fourth quadrant) moves clockwise from the lock-up position to the position (third quadrant) corresponding to the maximum allowable mold opening stroke T2, in the rectangular coordinate system having its origin on the pivotal point B above the center line CL, it moves substantially parallel to the center line CL, from the fourth quadrant to the third quadrant. As a result, although the first link 14 of FIG. 1 and the first link 8 of FIG. 3 rock at the same angle, a projected distance of movement of the pivotal point G in the mold clamping mechanism 1 of the embodiment shown in FIG. 1 with respect to the center line CL, that is, the horizontal movement of the crosshead 18, is shorter than that of the pivotal point E in the conventional five-point mold clamping mechanism 3 shown in FIG. 3. As long as the necessary width of the mold opening for the moving platen 7 is fixed, in consequence, the overall length T3 of the mold clamping mechanism 1 of the embodiment shown in FIG. 1 is made much shorter than the overall length T3 of the conventional five-point mold clamping mechanism 3 shown in FIG. 3.

Unless the span of the crosshead link 16 is lengthened extremely, therefore, the overall length T3 of the mold clamping mechanism 1 of the embodiment shown in FIG. 1 can be made much shorter than that of the conventional four-point mold clamping mechanism 2 shown in FIG. 2 or the conventional five-point mold clamping mechanism 3 shown in FIG. 3. In the embodiment shown in FIG. 1, therefore, the span of the crosshead link 16 is restricted to some short length by offsetting the pivotal point D on the crosshead 18 outward from the center line CL, thereby extending the arm length of the crosshead link 16.

According to the mold clamping mechanism 1 of the embodiment shown in FIG. 1, in other words, the overall length T3 of the mold clamping mechanism 1 is considerably shortened by reducing the movement of the crosshead 18 that is required in moving the moving platen 7 for the maximum allowable mold opening stroke T2. It can be also said, therefore, that the overall length T3 of the mold clamping mechanism 1 never becomes longer than the overall length T3 of the conventional four-point mold clamping mechanism 2 shown in FIG. 2 or the conventional five-point mold clamping mechanism 3 shown in FIG. 3 even though the span of the crosshead link 16 is extended to a certain degree such that the rectilinear movement of the crosshead 18 increases in some measure.

A great mold clamping force can be obtained favorably by increasing the length of the span of the crosshead 16. In the embodiment shown in FIG. 1, however, the pivotal point G is provided by forming the projection 17 at an outside position on the portion of the first link 14 which is near the node A of the toggle link 15, whereby the distal end of the crosshead link 16 is mounted on the toggle link 15 with an offset outside the central axis of the toggle link 15. It is quite unnecessary, therefore to lengthen the distance between D and G in the mold clamping mechanism 1 by locating the toggle link 15 with a substantial vertical offset from the center line CL of the mold clamping mechanism 1 or the path of movement of the crosshead 18, and the substantial mold clamping force can be increased by only, relatively shortening the arm length of the crosshead 18 to extend the span of the crosshead link 16.

Thus, if the span of the crosshead link 16 is extended so far as the effect of reduction of the overall length of the mold clamping mechanism 1, produced by the reduction of the movement of the crosshead 18 that is required in moving the moving platen 7 for the maximum allowable mold opening stroke T2, is not impeded, then the mold clamping mechanism 1 having the overall length T3 shorter than those of the conventional four-point mold clamping mechanism 2 shown in FIG. 2 and the conventional five-point mold clamping mechanisms shown in FIG. 3 and the substantial mold clamping force much greater than those of the conventional five-point mold clamping mechanism 3 shown in FIG. 3 and the conventional four-point mold clamping mechanism 2 shown in FIG. 2 can be constructed.

If necessary, moreover, a greater mold clamping force can be obtained by considerably lengthening the span of the crosshead link 16 without changing the vertical width T5 of the mold clamping mechanism 1 (in this case, the movement stroke of the crosshead 18 is so long that the overall length T3 cannot always be reduced). In contrast to this, the overall length T3 of the mold clamping mechanism 1 can be further reduced by considerably shortening the span of the crosshead link 16, thereby additionally shortening the necessary movement stroke of the crosshead 18 (in this case, the mold clamping force cannot always be enhanced).

The above is a description of the case of the double-toggle mold clamping mechanism in which the two toggle links 15 are arranged opposite each other and the case of the double-toggle mold clamping mechanism in which the pair of link units 15' composed of the two toggle links 15 that are arranged in parallel. Besides this, however, there has already been proposed a mold clamping mechanism of a three-tie-bar type, in which three tie bars are arranged at regular intervals on the circumference of one circle, and toggle links are arranged individually in all intermediate positions (therefore, three spots) between the tie bars. The arrangement of this three-tie-bar type is quite the same as the arrangement of the aforementioned embodiment in that two or more toggle links 15 or two or more pairs of link units 15' are arranged at regular intervals on the circumference of one circle in a manner such that the toggle links are bendable toward the crosshead (two toggle links are arranged at intervals of 180° on the circumference of one circle so as to be bendable toward the crosshead in the arrangement of FIG. 1). With use of an arrangement similar to the aforesaid one, the miniaturization of the mold clamping mechanism and the enhancement of the mold clamping force can be achieved concurrently.

Further, an arrangement that resembles the foregoing embodiment can be applied to a single-toggle mold clamping mechanism that is provided with only one toggle link. Basically, however, the mold clamping mechanism of the present invention is designed so that the toggle links are driven by means of the crosshead to perform the mold opening and clamping operations. It is hardly significant, therefore, to apply the invention to a single-toggle mold clamping mechanism in which the toggle links are bent or stretched by directly pushing or pulling the node portions of the toggle links with use of drive means, such as a hydraulic cylinder, that is located at right angles to the toggle links in the lock-up state. It is essential surely in the present invention that the toggle links are driven by a crosshead which moves in a straight line in the mold opening or clamping direction.

According to the arrangement in which the two or more toggle links are arranged at regular intervals on the circumference of one circle around the crosshead, forces acting at right angles to the axis of the crosshead, that is, forces acting in the respective axial directions of the crosshead links, arouse no problems because they are completely balanced. According to the arrangement in which only one toggle link is used, however, an eccentric force acts around the crosshead, thereby preventing the rectilinear movement of the crosshead or curving the ball screw and the like fixed to the crosshead, so that the arrangement shown in FIG. 1 cannot be applied directly.

Thus, if only the upper toggle link 15 is used in the arrangement of FIG. 1 in a manner such that its opposite ends are pivotally mounted on the respective central portions of the rear platen 6 and the moving platen 7 and that the mounting position for the crosshead 18 is offset downward, the crosshead 18 is pressed hard from above during the mold clamping operation, so that its rectilinear movement may be prevented or the ball screw of the crosshead 18 may be curved. In the case where only one toggle link 15 is bent downward, therefore, a force that acts on the crosshead 18 along the upper crosshead link 16 must be supported from under the crosshead 18 by some method or other. The easiest way to cope with this is to mount the crosshead 18 and a rectilinear drive mechanism, such as a ball nut-screw, for driving it with an offset reaching the lower end portion of the rear platen 6, and form the lower surface of the crosshead 18 flat so that the crosshead 18 can be slid with its lower surface supported by the upper surface of the body of the injection molding machine. Although this arrangement is subject to a problem that, a force acting on the rear platen 6 is asymmetric with respect to the axis of the rear platen 6, and is not always dynamically excellent, the mold clamping mechanism of the present invention is applicable to a single-toggle mold clamping mechanism, anyway.

We claim:

1. A mold clamping apparatus of an injection molding machine, comprising:

a toggle link rotatably connecting one end of a first link of which the other end is rotatably connected to a rear platen and one end of a second link of which the other end is rotatably connected to a moving platen;

a crosshead movable along a straight line in mold opening and closing directions by power from a drive source; and, a crosshead link having one end rotatably connected to a part of the crosshead and the other end to a projection formed on said first link;

wherein a projection of the first link, rotatably connecting the other end of said crosshead link, is formed on an outside position of said first link which is opposite of the side facing said crosshead, and said projection is proximate a node of said toggle link.

2. A mold clamping apparatus of an injection molding machine according to claim 1, wherein said first and second links constituting said toggle link are designed so as to bend toward the crosshead as said crosshead moves from a mold closing state to a mold opening state, and one or more sets of said toggle links are arranged at regular intervals along the circumference of a circle around the axis of the crosshead.

3. A mold clamping apparatus of an injection molding machine according to claim 2, wherein said first link constituting said one toggle link set is formed of a pair of rod-shaped members spaced and extending parallel to each other, said second link is formed of a pair of rod-shaped members spaced each other with a space different from that of the first link and extending parallel to each other, and both the space between the pair of rod-shaped members constituting the first link and the space between the pair of rod-shaped members constituting the second link have a size large enough to allow the passage of the crosshead link.

4. A mold clamping apparatus of an injection molding machine according to claim 2, wherein said first link constituting said one toggle link set is formed of a pair of substantially bilaterally symmetrical first link elements arranged in parallel, said second link is formed of a pair of substantially bilaterally symmetrical second link elements arranged in parallel, and both the gap between the first link elements constituting the first link and the gap between the second link elements constituting the second link have a size large enough to allow the passage of said crosshead link.

5. A mold clamping apparatus of an injection molding machine according to claim 4, wherein each of the pair of first link elements constituting said first link has one end, single rod-shaped to be connected to the rear platen, and the other end, forked into two branches to be connected to the opposite first link, one of the pair of said second link elements is received between said forked branches of the first link element, and the respective inside branches of said pair of first link elements are spaced wide enough to allow the crosshead link to pass freely between said branches.

6. A mold clamping apparatus of an injection molding machine according to claim 5, wherein the respective inside branches of said pair of first link elements are formed with projections individually, a pin is supported on these projections and the one end of the crosshead link is rockably connected to the pin.

7. A mold clamping apparatus of an injection molding machine according to claim 1, wherein the projection formed on said first link is located in a region of the first link which is near the junction between the first and second links.

* * * * *